July 27, 1937 H. W. CARDWELL Re. 20,454

WELL SPUDDING APPARATUS

Original Filed May 18, 1934 2 Sheets-Sheet 1

Harlund W. Cardwell Inventor

By Bacon & Thomas

Attorneys

July 27, 1937. H. W. CARDWELL Re. 20,454

WELL SPUDDING APPARATUS

Original Filed May 18, 1934 2 Sheets-Sheet 2

Harland W. Cardwell Inventor

By Bacon & Thomas

Attorneys

Reissued July 27, 1937 Re. 20,454

UNITED STATES PATENT OFFICE 20,454

WELL SPUDDING APPARATUS

Harland W. Cardwell, Wichita, Kans., assingor to The All Steel Products Manufacturing Company, Wichita, Kans., a corporation of Kansas Original No. 2,028,697, dated January 21, 1936, Serial No. 726,403, May 18, 1934. Application for reissue March 20, 1937, Serial No. 132,182

11 Claims. (Cl. 255—11)

This invention relates to new and useful improvements in well spudding apparatus.

The primary object of the invention is to provide well spudding apparatus of an extremely compact design which, due to the arrangement of the spudding arms and their driving shaft with relation to the remainder of the mechanism, enables the apparatus to be used on the derrick floor as distinguished from being located outside the derrick.

A further important object of the invention is to position the spudding arms with their driving shaft relative to the cable drum so that cable interference is eliminated.

A still further object of the invention is to arrange the cable drum, the spudding arms with a cable engaging sheave, and the spudding arm driving mechanism relative to each other to provide a maximum amount of tool stroke with each up and down movement of the spudding arms and to reduce to a minimum the power transmission from the prime mover to the cable operating sheave carried by the spudding arms.

Another important object of the invention is to provide means for adjusting the sheave carrying shaft relative to the spudding arms, employed for actuating said shaft, so that the stroke of the cable operating sheave may be lengthened or shortened.

A further object of the invention is to provide a novel form of spudding arm which is designed to provide maximum strength and minimum weight.

A still further object of the invention is to provide a novel form of driving mechanism for the spudding arms.

Other objects and advantages of the invention will be apparent during the course of the following description.

In the accompanying drawings forming a part of this specification, and in which like numerals are employed to designate like parts throughout the same.

Figure 1:
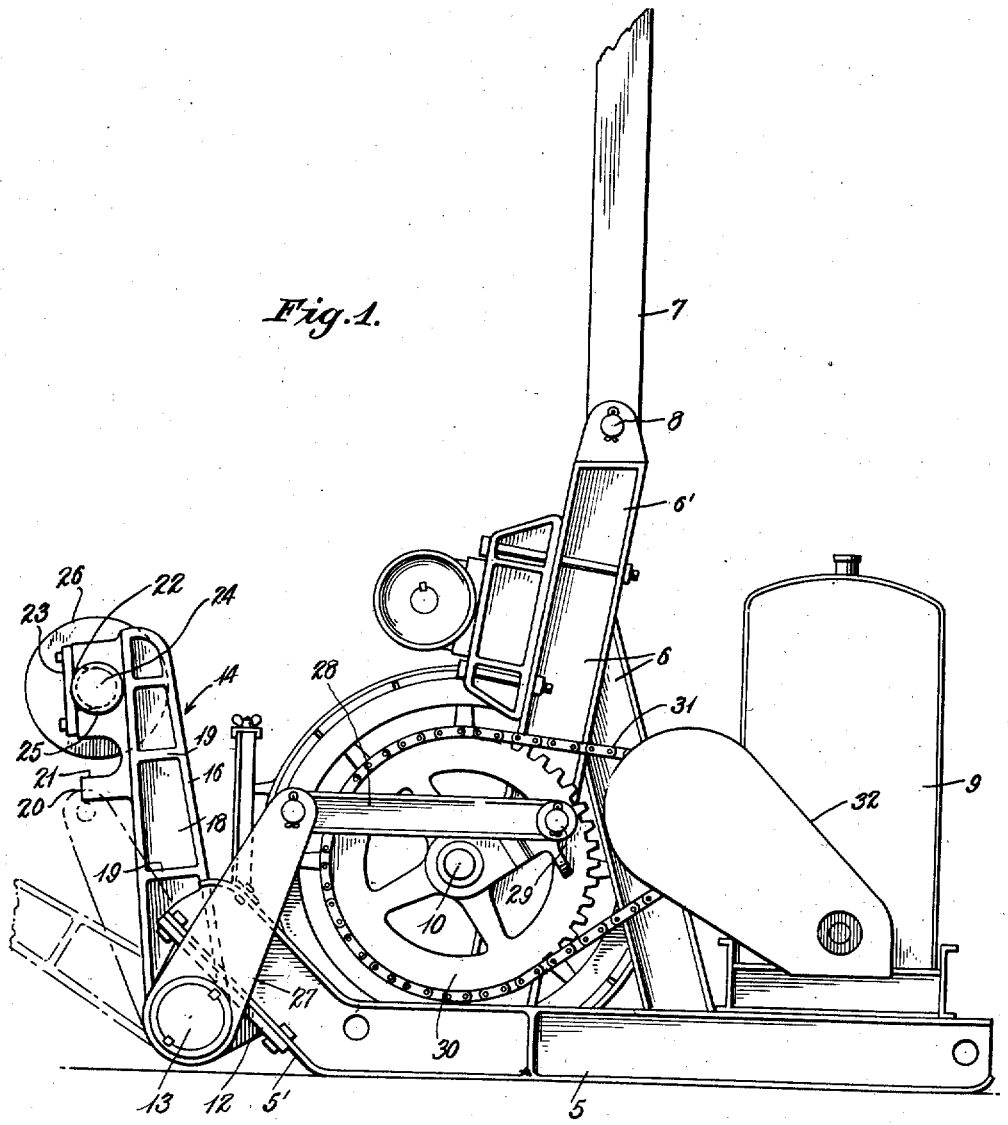
Figure 1 is a side elevational view of the well spudding apparatus embodying this invention.

In the drawings, wherein for the purpose of illustration is shown a preferred embodiment of this invention, numeral 5 designates in its entirety the chassis of the spudding apparatus. This chassis includes a pair of parallel beams which are suitably interconnected and transversely braced by any suitable means, not illustrated in detail in the drawings. An upstanding frame is mounted on the chassis 5 intermediate the length of the same. This upstanding frame includes a pair of angularly arranged beams 6 mounted on each side beam of the chassis 5. The beams in each pair are angularly arranged with respect to each other to form an inverted V with the upper ends of the beams suitably connected. One of the beams 6, on each side of the chassis, projects upwardly to form the mast mounting portion 6'. Fig. 1 discloses a portion of a mast 7 pivotally connected to the beam mounting extension 6' by means of a pin, or the like, 8. It is to be understood that the mast 7 includes a portion pivotally connected to each one of the beam mounting extensions 6' of the upstanding frame.

Mounted on one end of the chassis 5 to extend transversely thereof is a prime mover 9. It is to be understood that this prime mover may take the form of a gasoline engine or an electric motor. The prime mover 9, as is clearly illustrated in Fig. 1, is located on one side of the upstanding frame.

A shaft 10 is mounted by means of suitable bearings to extend transversely of the chassis 5, and to be supported by the upstanding frame. This shaft 10 has mounted thereon the cable drum 11. It will be noted that the shaft 10 is arranged above the side beams of the chassis 5.

Figure 2:
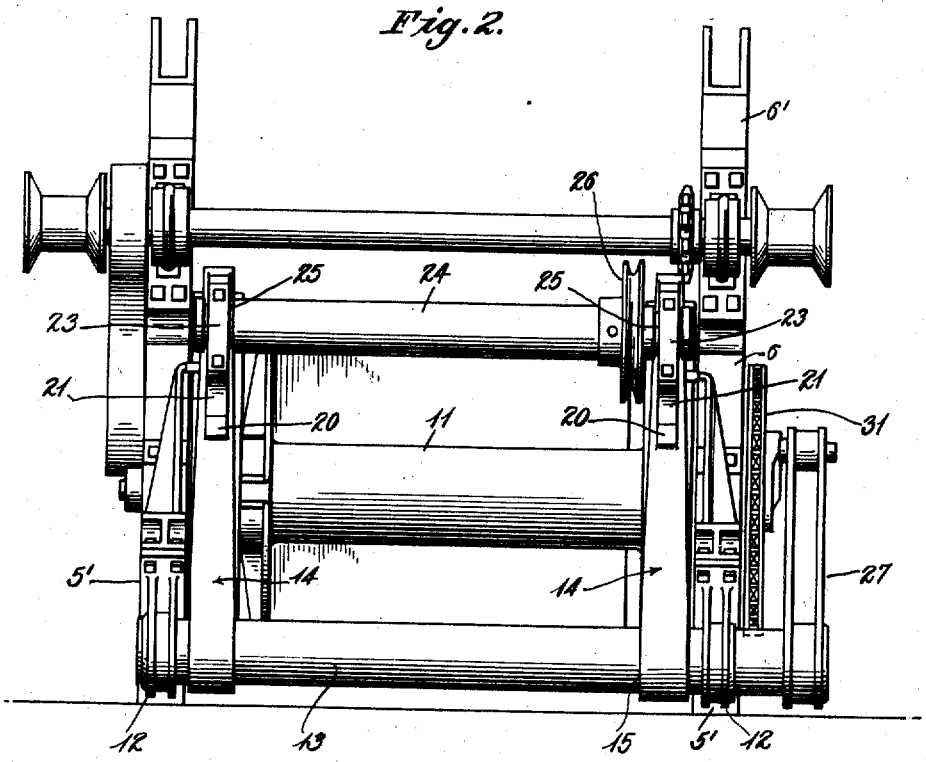
Figure 2 is a front elevational view of the apparatus shown in Fig. 1.

The forward ends 5' of the parallel beams which form the chassis 5 are bent upwardly, as clearly illustrated in Figs. 1 and 2. Bearings 12 are fastened to the underneath portions of the upwardly bent ends 5' and are provided for rockably supporting a spudding shaft 13, which extends transversely of the chassis 5. Figs. 1 and 2 very clearly illustrate the fact that the spudding shaft 13 is located very close to the ground level and has its axis arranged in parallelism with and on a plane beneath the axis of the shaft 10 on which the cable drum 11 is mounted. Suitably keyed to the spudding shaft 13, adjacent opposite ends of said shaft, are the spaced spudding arms 14.

Figure 3:
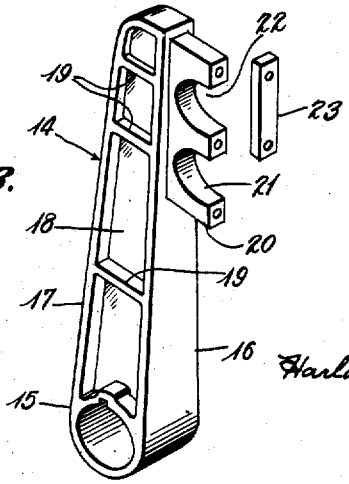
Figure 3 is a detailed perspective view illustrating the type of spudding arm employed in the apparatus shown in Figs. 1 and 2.

Fig. 3 discloses in detail one of these spudding arms. It will be noted that the arm is relatively short and includes a shaft receiving portion 15 at one end. The arm is made as light as possible and yet possesses a great deal of inherent strength in view of the fact that the main body of the arm is of substantially I formation, which includes the longitudinally extending edge flanges 16 and 17 and the interconnecting web 18. Transversely extending bracing webs 19 also are provided to increase the strength of the arm. Projecting laterally from the edge flange 16 is a double yoke member 20 formed with two substantially U-shaped depressions 21 and 22. A strap 23 is provided and is adapted to be arranged to bridge either one of the pockets or depressions 21—22.

A sheave supporting shaft 24 is provided and is adapted to have its opposite ends arranged in either the depressions or pockets 21 or the depressions or pockets 22 of the double yoke structures 20 carried by the spudding arms 14. It will be noted, by inspecting Figs. 1 and 2, that the opposite end portions of the sheave shaft 24 are provided with annular grooves 25 which register with the depressions or pockets 21—22 for restraining the sheave shaft against axial movement relative to the spudding arms. The straps 23 also fit in the grooves 25 of the sheave shaft 24. A loosely positioned sheave 26 is mounted upon the shaft 24 and is adapted for free rotation and slidable movement upon this shaft. By arranging the sheave shaft 24 in either one of the pairs of depressions or pockets 21—22, the stroke of the sheave shaft with its sheave may be varied. In other words, the sheave shaft 24 may be located different distances from the axis of the spudding shaft 13. This adjustability of the stroke of the sheave shaft is of utmost importance as it permits the stroke of the tool operating cable to be lengthened or shortened and it permits variation in the power requirements for lifting the drilling tool. For example, when the sheave shaft is arranged in the inner set of pockets or depressions 21, the power required to lift a ten thousand foot string of tools is twenty-five percent less than when the sheave shaft is located in the pair of pockets or depressions 22.

The driving mechanism for the spudding shaft may be described as follows: keyed to one end of the spudding shaft is an arm 27. By inspecting Fig. 1, it will be noted that this spudding shaft operating arm 27 is arranged at an acute angle with respect to the spudding arms 14. The outer end of the arm 27 has pivotally connected thereto a pitman 28, the free end of which is pivotally connected to a crank pin 29 carried by the sprocket wheel 30. This sprocket wheel is loosely mounted upon the drum shaft 10 and has trained thereover a sprocket chain 31. This sprocket chain travels through a gear housing or casing 32 in which is located transmission mechanism driven by the prime mover 9. The details of this transmission mechanism have not been illustrated as any suitable form of gearing or chain and sprocket wheel mechanism may be provided.

It will be understood that the drilling tool operating cable, of course, is properly associated with the cable drum 11 and is led off of the drum around the sheave 26 by passing underneath the sheave and around the outer side of the same where it passes to the crown block of the derrick structure. Rocking movement of the spudding shaft 13, due to rotation of the sprocket wheel 30, results in oscillatory movement of the spudding arms 14, as illustrated in Fig. 1. This oscillatory movement of the spudding arms, when the cable drum 11 is held against rotation, results in longitudinal movement of the tool operating cable. This longitudinal movement of the cable effects rise and fall of the tool in the usual manner.

It is believed to be advisable to briefly point out some of the novel and most important features of this design of spudding apparatus. It will be noted that the prime mover, the mast, the cable drum, and the spudding arms are very compactly arranged on a relatively short chassis. The upstanding frame, located intermediate the ends of the chassis, functions to support the mast 7 and the cable drum 11. The axis of the cable drum is located above the chassis 5. The upwardly bent ends 5' of the chassis side beams enable the spudding shaft 13 to be mounted very close to the ground level and beneath the axis of the cable drum. It further will be noted that the spudding shaft is arranged in close proximity to the cable drum. The spudding arms 14 are relatively short and when these arms are arranged in their vertical position, the upper ends of the same are located but a short distance above the cable drum 11. The sheave shaft carried by the outer end portions of the spudding arms 14 may be arranged in two different positions with respect to the length of the spudding arms which permits variation of the stroke of the sheave shaft with its cable engaging sheave. It has been pointed out above that the design of the spudding arms results in maximum strength with a minimum amount of material. The arrangement of the spudding shaft operating arm 27 with respect to the spudding arms 14 and the type and arrangement of elements employed for actuating the arm 27 provide for a maximum mechanical advantage with the use of a minimum amount of equipment.

It will be noted that this well spudding apparatus constitutes a unit which may be positioned on any suitable supporting surface to rest upon the parallel beams of the chassis 5. These parallel beams, as disclosed in the drawings, may function as skids to enable the apparatus to be pulled over the ground, or any other supporting surface. It will be appreciated, also, that this entire unit may be mounted upon a tractor, or any other motor vehicle, for transportation purposes or for actual use to perform a spudding operation.

It is to be understood that the form of this invention herewith shown and described is to be taken as a preferred example of the same and that various changes in the shape, size and arrangement of parts may be resorted to without departing from the spirit of the invention or the scope of the subjoined claims.

Having thus described the invention, I claim:

1. Well spudding apparatus of the type described comprising a chassis formed of parallel side beams having upwardly bent ends, a spudding shaft rockably mounted on the underneath surfaces of said upwardly bent beam ends, a pair of spudding arms fixed on said spudding shaft, a sheave slidably and rotatably carried by the spudding arms, a cable drum supported on the chassis above the plane of the spudding shaft, and means for driving the spudding shaft to effect oscillation of the spudding arms.

2. Well spudding apparatus comprising a rockable spudding shaft, means for rocking said shaft, a pair of spudding arms fixed on said shaft, a double yoke structure carried by the outer end portion of each spudding arm, said double yoke structures having two aligned pairs of depressions or pockets, a sheave shaft, and means for mounting the sheave shaft in either one of the aligned pairs of depressions or pockets.

3. Well spudding apparatus of the type described comprising a spudding shaft, means for rockably supporting said shaft, means for driving said shaft, a pair of spudding arms fixed on said shaft, a sheave shaft, and means for adjustably connecting the sheave shaft to both of the spudding arms.

4. Well spudding apparatus of the type described comprising a chassis formed of parallel side beams having upwardly offset end portions, a spudding shaft rockably mounted on the underneath surfaces of said end portions, a spudding arm fixed at one end on said spudding shaft and having a pair of shaft receiving openings adjacent its remaining end, a shaft carrying a sheave adapted to be mounted in either one of said openings, means for removably retaining the shaft in place in said openings, and means for driving the spudding shaft to effect oscillation of the spudding arm.

5. Well spudding apparatus of the type described comprising a chassis formed of parallel side beams adapted to act as skid supports for the apparatus, one end portion of each of said side beams being shaped to provide a space between it and a surface on which the chassis rests, a shaft bearing mounted on each of said end portions of the side beams to occupy said spaces, a spudding shaft rockably mounted in said bearings, a spudding arm comprising an I-shaped body portion fixed on said shaft, said arm having a pair of shaft bearing openings adjacent its outer end, a sheave having a shaft adapted to be mounted in either of said bearing openings, means for holding said sheave shaft positioned in said openings, an upstanding frame carried by the chassis, a cable drum rotatably supported on the upstanding frame at an elevation which will cause it to clear a surface on which the apparatus is supported, a prime mover mounted on the chassis, and drive connections between the prime mover and the cable drum and spudding shaft.

6. Well spudding apparatus of the type described comprising a chassis formed of parallel side beams having upwardly bent ends, a spudding shaft rockably mounted on the underneath surfaces of said upwardly bent beam ends, a spudding arm fixed on said spudding shaft, a sheave slidably and rotatably carried by the spudding arm, a cable drum supported on the chassis above the plane of the spudding shaft, and means for driving the spudding shaft to effect oscillation of the spudding arm.

7. Well spudding apparatus comprising a rockable spudding shaft, means for rocking said shaft, a spudding arm fixed on said shaft, a double yoke structure carried by the outer end portion of the spudding arm, said double yoke structure having a plurality of depressions or pockets, a sheave shaft, and means for mounting the sheave shaft in one of the depressions or pockets.

8. Well spudding apparatus of the type described, comprising a spudding shaft, means for rockably supporting said shaft, means for driving said shaft, a spudding arm fixed on said shaft, a sheave shaft, and means for adjustably connecting the sheave shaft to the spudding arm.

9. Well spudding apparatus of the type described, comprising a spudding shaft, means for rockably supporting said shaft, means for driving said shaft, a spudding arm fixed on said shaft, and an elongated sheave shaft including a slidable sheave mounted upon the spudding arm.

10. Well spudding apparatus of the type described comprising a chassis formed of parallel side beams adapted to act as skid supports for the apparatus, a spudding shaft, means for rockably supporting said shaft with respect to said side beams, a spudding arm fixed on said shaft, a sheave shaft carried by said spudding arm, a sheave mounted for free rotation and slidable movement upon said sheave shaft and means for driving the spudder shaft to effect oscillation of the spudding arm.

11. Well spudding apparatus of the type described comprising a chassis formed of parallel side beams adapted to act as skid supports for the apparatus, a spudding shaft, means for rockably supporting said shaft with respect to said side beams, a pair of spudding arms each fixed on said shaft at opposite ends thereof, said spudding arms having laterally extending strengthening portions, a sheave shaft disposed between and carried by said spudding arms, a sheave mounted for free rotation and slidable upon said sheave shaft and means for driving the spudding shaft to effect oscillation of the spudding arm.

HARLAND W. CARDWELL.